March 17, 1931.  S. G. RUSSELL  1,797,023
FISHING REEL
Filed Nov. 5, 1928
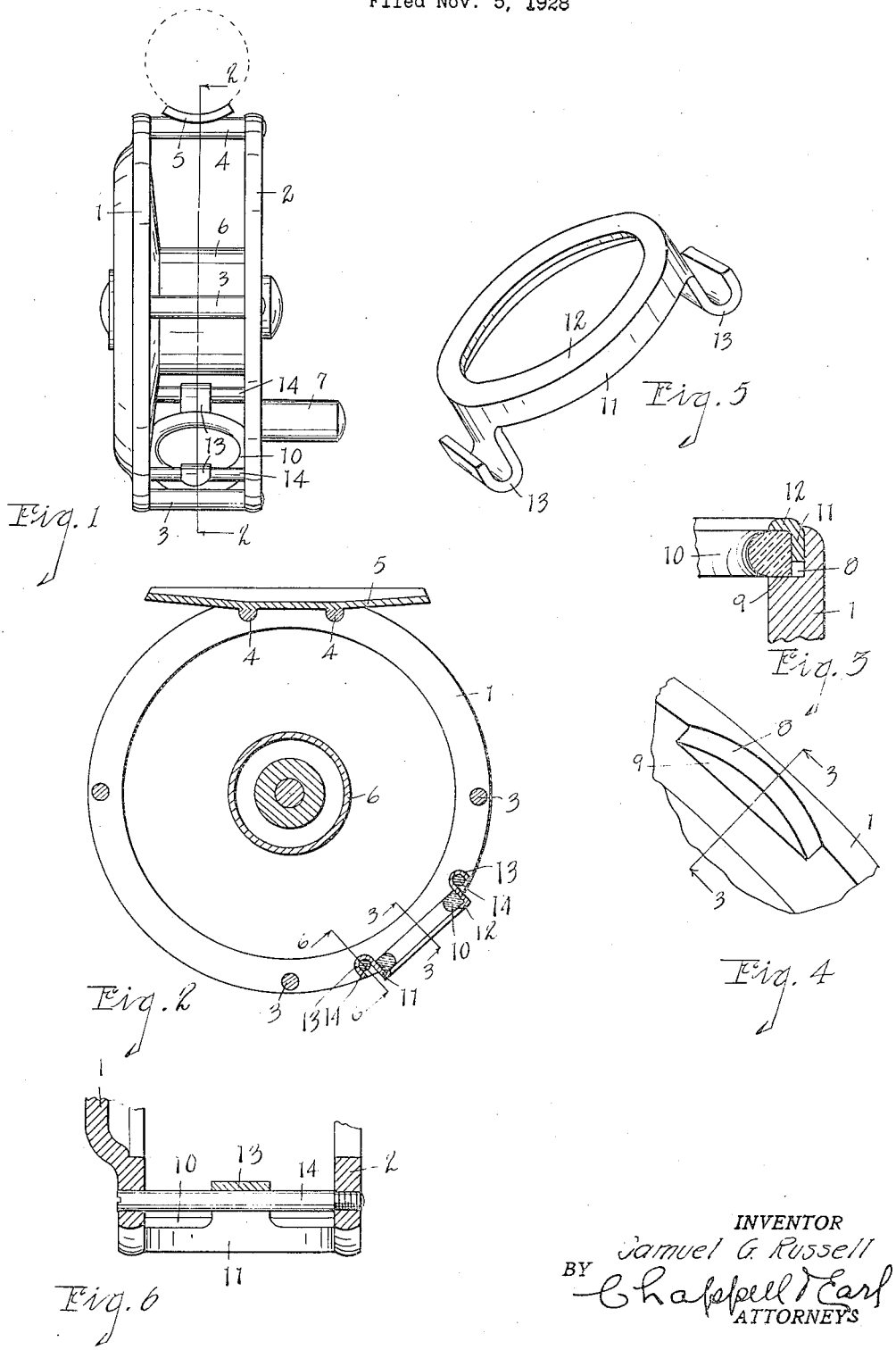
INVENTOR
Samuel G. Russell
BY Chappell & Earl
ATTORNEYS Patented Mar. 17, 1931

1,797,023

UNITED STATES PATENT OFFICE

SAMUEL G. RUSSELL, OF KALAMAZOO, MICHIGAN, ASSIGNOR TO SHAKESPEARE COMPANY, OF KALAMAZOO, MICHIGAN

FISHING REEL

Application filed November 5, 1928. Serial No. 317,213.

The main object of this invention is to provide in a fishing reel an improved line guide eye structure which facilitates the assembling of the parts and permits the ready disassembling should occasion require for renewal and replacement.

A further object is to provide a mounting for the line guide eye in which the eye proper such as agate is very effectively protected.

Objects pertaining to details and economies of my invention will definitely appear from the description to follow. The invention is defined in the claims.

A fishing reel which embodies the features of my invention is clearly illustrated in the accompanying drawing in which:

Fig. 1 is a rear elevational view of a fishing reel embodying the features of my invention.

Fig. 2 is a vertical section on line 2—2 of Fig. 1.

Fig. 3 is an enlarged detail section on line 3—3 of Figs. 2 and 4.

Fig. 4 is a fragmentary perspective view of one of the end members of the frame showing the line guide eye seat therein.

Fig. 5 is a perspective view of the line guide eye holder.

Fig. 6 is a detail section on line 6—6 of Fig. 2.

In the embodiment illustrated the reel frame comprises end members 1 and 2 connected by pillars 3 and 4, the reel seat being secured to the pillars 4. The spool 6 is provided with a handpiece 7. The details of the spool and its mounting are not illustrated as they form no part of this invention.

The end members of the frame have opposed recesses 8 therein providing shoulder-like seats 9 for the line guide eye 10 which is preferably of agate, but may be of any suitable material. The line guide eye 10 is protected and secured on its seat by means of the annular holder 11 having a flange 12 overlapping the eye as shown in Fig. 3.

This holder has opposed outwardly facing hooked lugs 13 which are engaged by the cross rods 14 arranged through one of the frame members and threaded into the other, thereby detachably securing the holder and retaining the eye upon its seat.

It will be clear that it is only necessary to remove one of the rods in order to release the holder as with one removed it may be pivoted or swung on the other.

My improvements greatly facilitate the assembling of the eye in the reel and permit its disassembling and reassembling should occasion require. The eye is also effectively protected.

I have not attempted to illustrate certain modifications and adaptations to other types of reels as it is believed that this disclosure will enable those skilled in the art to embody or adapt my improvements as may be desired.

Having thus described my invention what I claim as new and desire to secure by Letters Patent is:

1. In a fishing reel, the combination of a frame comprising end members having peripheral recesses therein providing shoulder-like line guide eye seats, a line guide eye disposed on said seats, an annular holder embracing said eye and provided with a flange overlapping the upper side thereof and with oppositely disposed lugs disposed between said frame members, and removable cross rods extending between said frame members and engaging said lugs.

2. In a fishing reel, the combination of a frame comprising end members having outwardly facing seats, a line guide eye disposed on said seats, an annular holder for said eye provided with outwardly facing hooked lugs disposed between said frame members, and cross members extending between said frame members disposed to engage said lugs, at least one of said cross members being removable.

3. In a fishing reel, the combination of a frame comprising end members provided with opposed line guide eye seats, a line guide eye arranged on said seats, an annular holder flanged to overlap said line guide eye, and removable means extending between said frame members for detachably engaging said holder.

4. In a fishing reel, the combination of a frame having end members having peripheral recesses therein providing shoulder-like line guide eye seats, a line guide eye disposed on said seats, a holder engaging said eye, and cross rods extending between said frame members and engaging said holder, at least one of said cross rods being removable.

5. In a fishing reel, the combination of a frame comprising end members, a line guide eye, an annular holder for said eye disposed between and supported by said end members and provided with outwardly facing hooked lugs disposed between said frame members, and cross rods extending between said frame members and engaging said holder lugs, at least one of said cross rods being removable.

6. In a fishing reel, the combination of a frame comprising end members having opposed peripheral recesses providing shoulder-like line guide eye seats, an annular holder flanged to overlap said line guide eye and constituting a support and guard therefor, and means extending between said end members for detachably securing said holder in position.

In witness whereof I have hereunto set my hand.

SAMUEL G. RUSSELL.